United States Patent
Munakata et al.

(10) Patent No.: US 12,135,842 B2
(45) Date of Patent: Nov. 5, 2024

(54) CONTROLLER AND TRACKING SYSTEM

(71) Applicant: Wacom Co., Ltd., Saitama (JP)

(72) Inventors: Hiroshi Munakata, Saitama (JP); Jun Hasegawa, Saitama (JP); Futa Imata, Saitama (JP); Hiroshi Fujioka, Saitama (JP); Yuta Sato, Saitama (JP); Kiyokazu Sakai, Saitama (JP); Ryoichi Kikuchi, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 18/472,067

(22) Filed: Sep. 21, 2023

(65) Prior Publication Data

US 2024/0012492 A1 Jan. 11, 2024

Related U.S. Application Data

(63) Continuation of application No. PCT/JP2021/047473, filed on Dec. 22, 2021.

(30) Foreign Application Priority Data

Mar. 22, 2021 (JP) .................. 2021-047265

(51) Int. Cl.
*G06F 3/0346* (2013.01)
*G06F 3/03* (2006.01)
*G06F 3/0354* (2013.01)
*G06T 7/246* (2017.01)

(52) U.S. Cl.
CPC .......... *G06F 3/0346* (2013.01); *G06F 3/0325* (2013.01); *G06F 3/03545* (2013.01); *G06T 7/246* (2017.01); *G06T 2207/10016* (2013.01)

(58) Field of Classification Search
CPC .. G06F 3/0346; G06F 3/0325; G06F 3/03545; G06T 6/246; G06T 2207/10016
See application file for complete search history.

(56) References Cited

U.S. PATENT DOCUMENTS

| | | | |
|---|---|---|---|
| 2002/0027548 A1 | 3/2002 | Yoneno | |
| 2005/0073508 A1* | 4/2005 | Pittel | G06F 3/03542 345/175 |
| 2007/0037611 A1 | 2/2007 | Mori et al. | |
| 2011/0043446 A1* | 2/2011 | Spears | G06F 3/0325 345/156 |

(Continued)

FOREIGN PATENT DOCUMENTS

| | | |
|---|---|---|
| JP | H11-143629 A | 5/1999 |
| JP | 2017-10314 A | 1/2017 |

(Continued)

OTHER PUBLICATIONS

International Search Report for International Application No. PCT/JP2021/047473, mailed April 5, 2023. (7 pages) (with English Translation).

*Primary Examiner* — Peter D McLoone
(74) *Attorney, Agent, or Firm* — Seed IP Law Group LLP

(57) ABSTRACT

A pen-type controller includes a pen portion having a pen shape, a grip portion that intersects an axis direction of the pen portion, and a first light emitting part disposed at an end part of the grip portion, wherein the end part is closer to the axis of the pen portion than another end part of the grip portion.

11 Claims, 12 Drawing Sheets

(56) References Cited

U.S. PATENT DOCUMENTS

| | | | |
|---|---|---|---|
| 2015/0062013 A1* | 3/2015 | Solomon | G06F 3/0346 345/158 |
| 2020/0014843 A1* | 1/2020 | Ogawa | G06F 1/1626 |
| 2020/0401245 A1* | 12/2020 | Munakata | G06F 3/03545 |
| 2021/0072847 A1 | 3/2021 | Ide et al. | |
| 2022/0413628 A1* | 12/2022 | Lohse | G06F 3/014 |

FOREIGN PATENT DOCUMENTS

| | | |
|---|---|---|
| JP | 2017-97696 A | 6/2017 |
| WO | 2005/024616 A1 | 3/2005 |
| WO | 2019/181118 A1 | 9/2019 |
| WO | 2019/225170 A1 | 11/2019 |

* cited by examiner

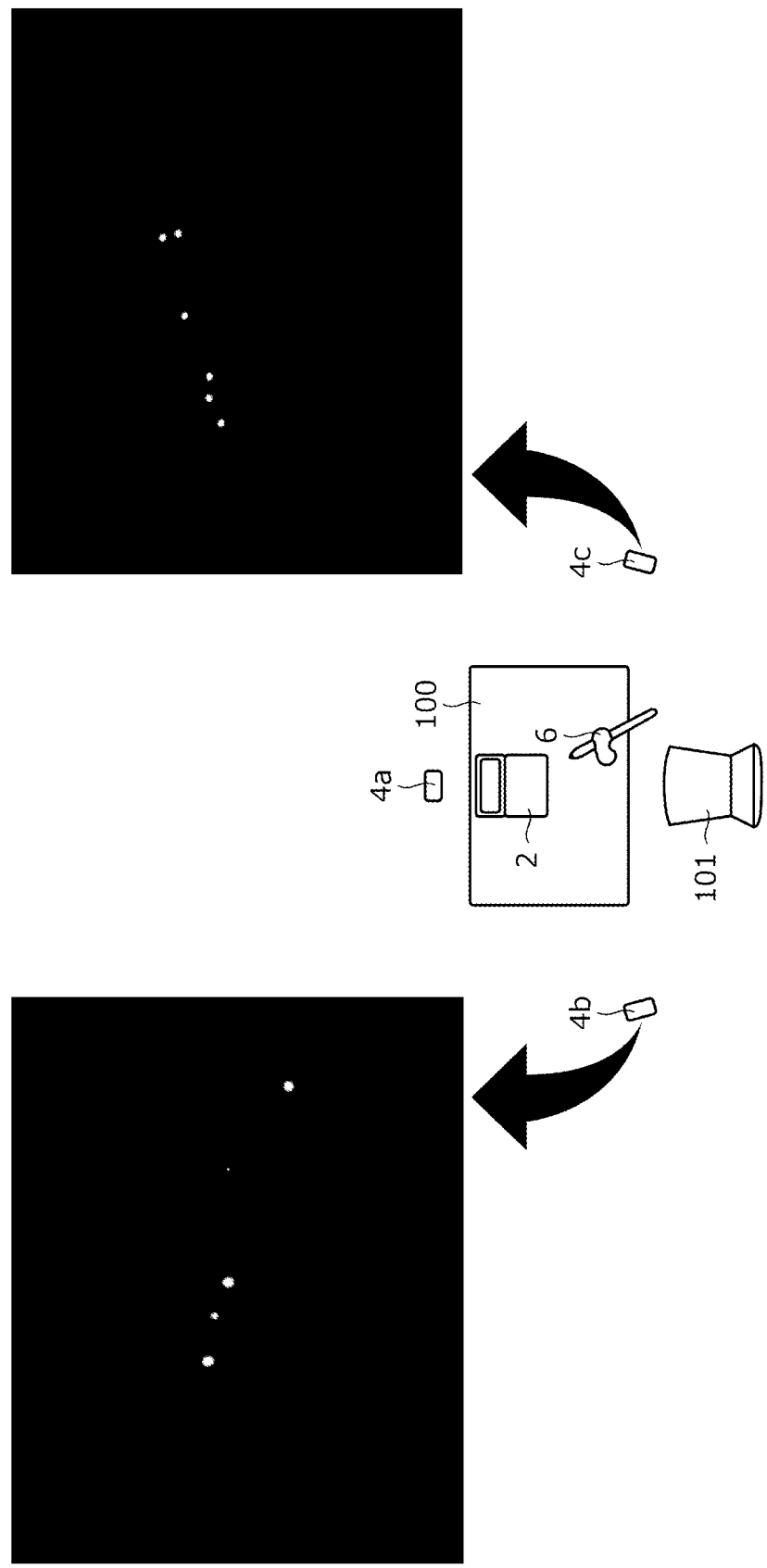

CONTROLLER AND TRACKING SYSTEM

BACKGROUND

Technical Field

The present disclosure relates to a controller and a tracking system and particularly to a controller used in a space configured by an XR technique ("XR space"), such as by virtual reality (VR), augmented reality (AR), mixed reality (MR), and substitutional reality (SR) techniques, and a tracking system for tracking the motion of such controller.

Description of the Related Art

In the XR technique, a controller of a hand-held type is used in order for the user to indicate a position in the XR space. Tracking of the controller is executed by a tracking system including a camera and a computer connected to the camera. When the user moves the controller in a range in which the controller can be imaged by the camera, the computer detects a position and orientation of the controller on the basis of a video obtained by imaging by the camera and executes tracking of the motion of the controller on the basis of a result of the detection.

In International Patent Publication No. 2019/225170 (hereinafter, Patent Document 1), an example of a pen-type controller is disclosed which is a hand-help type of controller.

Multiple light emitting diodes ("LEDs") are disposed on a surface of the controller disclosed in Patent Document 1. A computer that executes tracking of the motion of the controller is configured to detect the position and the orientation of the controller by detecting these LEDs from the video obtained by imaging by a camera.

However, when the LED is hidden by a hand of the user or the like, it becomes difficult to detect the position and the orientation of the controller with high accuracy.

BRIEF SUMMARY

Therefore, according to one aspect of the present disclosure, a pen-type controller is provided which allows detection of the position and the orientation of the controller with high accuracy.

Moreover, in the above-described existing tracking system, a camera that can take a video with little distortion is used because the detection accuracy of the position and the orientation of the controller decreases when distortion exists in the video taken by the camera. Specifically, a camera having a global shutter is used which can scan the respective rows of an image sensor at once.

However, the camera having a global shutter is expensive in general, and therefore, the cost of the tracking system as a whole becomes high. Thus, a technique is required that allows detection of the position and the orientation of the controller with high accuracy while using a camera having a rolling shutter less expensive than the global shutter.

Therefore, according to another aspect of the present disclosure, a tracking system is provided which allows detection of the position and the orientation of the controller with high accuracy while using a camera having a rolling shutter.

A controller according to the present disclosure is a controller including a pen portion having a pen shape, a grip portion that intersects with an axis direction of the pen portion, and a first light emitting part disposed at an end part of the grip portion which is closer to the axis direction (or the axis) of the pen portion than another end part of the grip portion.

A tracking system according to the present disclosure is a tracking system for tracking the motion of the above-described controller, the tracking system including one or more cameras each having a rolling shutter and disposed in such a manner that a sub-scanning direction of the rolling shutter corresponds to a vertical direction, and a computer that executes tracking of motion of the controller on the basis of a video captured by the one or more cameras.

According to the controller according to the present disclosure, it becomes possible to detect the position and the orientation of the controller with high accuracy.

According to the tracking system according to the present disclosure, it becomes possible to detect the position and the orientation of the controller with high accuracy with use of the rolling shutter.

BRIEF DESCRIPTION OF THE SEVERAL VIEWS OF THE DRAWINGS

FIG. 7 is a diagram illustrating videos taken by cameras that capture the controller according to the embodiment of the present disclosure;

DETAILED DESCRIPTION

An embodiment of the present disclosure will be described in detail below with reference to the accompanying drawings.

Figure 1:
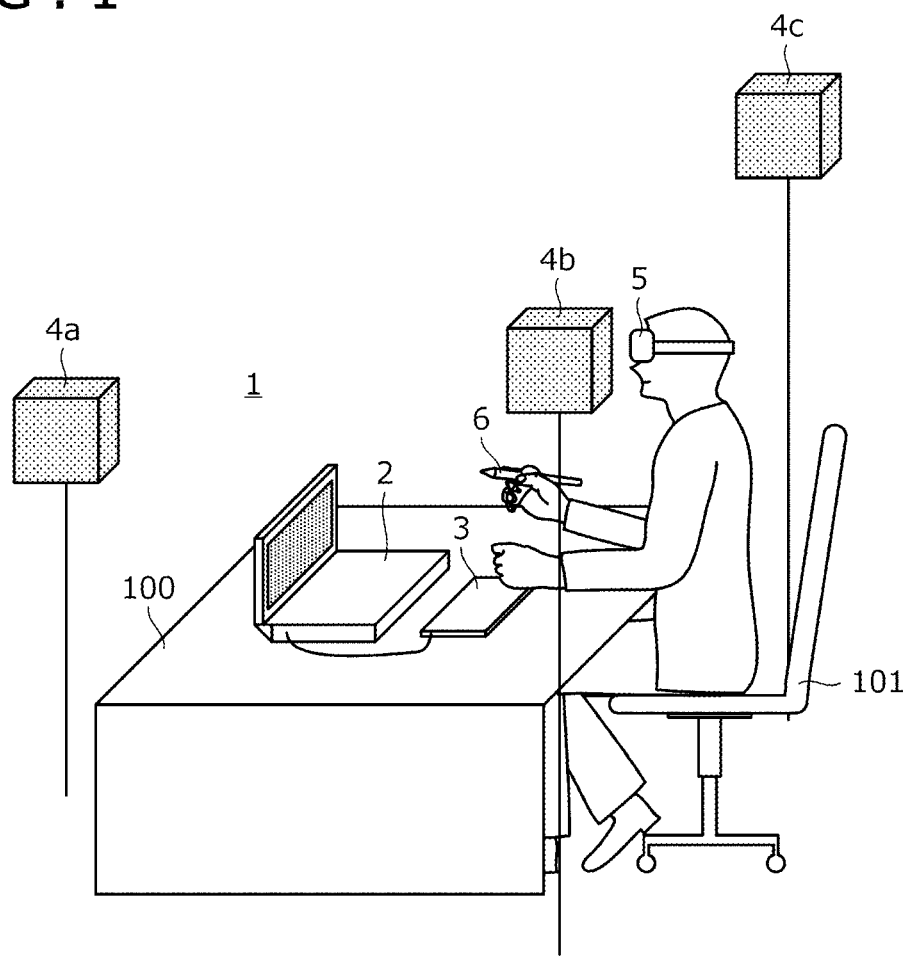
FIG. 1 is a diagram illustrating a use state of a tracking system according to an embodiment of the present disclosure.

FIG. 1 is a diagram illustrating a use state of a tracking system 1 according to the present embodiment. As illustrated in this diagram, the tracking system 1 is configured to include a computer 2, a position detecting device 3, three cameras 4a to 4c, a head-mounted display 5, and a controller 6 of a pen type. The configuration is made such that the computer 2 can communicate with each of the position detecting device 3, the cameras 4a to 4c, the head-mounted display 5, and the controller 6 in a wired or wireless manner.

As illustrated in FIG. 1, a user uses the tracking system 1 in a state in which the user sits in a desk chair 101 and wears the head-mounted display 5 on the head and holds the controller 6 with the right hand. An XR space obtained by rendering by the computer 2 is displayed on a display surface of the head-mounted display 5, and the user operates the controller 6 over a desk 100 while viewing the XR space. The controller 6 is a pen-type device having a shape in which a grip is attached to a pen and executes control of three-dimensional (3D) objects displayed in the XR space (specifically, rendering of 3D objects, movement of 3D objects, and so forth). Moreover, the controller 6 is used, together with the position detecting device 3, to make two-dimensional (2D) user input.

In the example of FIG. 1, the computer 2 is configured by a notebook personal computer disposed at the center of the desk 100. However, the computer 2 does not have to be disposed at the center of the desk 100, and it suffices to arrange the computer 2 at a position at which the computer 2 can communicate with the position detecting device 3, the cameras 4a to 4c, the head-mounted display 5, and the controller 6. Moreover, the computer 2 can be configured by various types of computers, such as a desktop personal computer, a tablet personal computer, a smartphone, and a server computer, besides the notebook personal computer.

The computer 2 plays a role in tracking the motion of the head-mounted display 5, the controller 6, and the position detecting device 3 by periodically detecting a position and a tilt of each of these devices on the basis of videos captured by the cameras 4a to 4c. The computer 2 executes processing of generating the XR space and a 3D object displayed therein based on the motion of each device tracked by the computer 2 and the operation state of each operation button and dial button disposed on the controller 6, which will be described later. The computer 2 renders the generated XR space and 3D object and transmits them to the head-mounted display 5. The head-mounted display 5 displays the XR space including one or more 3D objects by displaying the rendering image transmitted from the computer 2.

In the example of FIG. 1, the position detecting device 3 is configured by a tablet disposed at a position corresponding to the front side of the computer 2 as viewed from the user in the upper surface of the desk 100. However, the position detecting device 3 does not have to be disposed at this position, and it suffices to dispose the position detecting device 3 in a range within the reach of a hand of the user who sits in the desk chair 101. Moreover, the position detecting device 3 and the computer 2 may be configured as an integrated device such as a tablet terminal, for example.

The position detecting device 3 has functions of periodically detecting the position of the pen tip of the controller 6 on a touch surface and sequentially transmitting the detected position to the computer 2. The computer 2 executes generation and rendering of stroke data that forms a 2D object or a 3D object on the basis of the transmitted position. Although the specific system of the position detection by the position detecting device 3 is not particularly limited, it is preferable to use the active capacitive system or the capacitive induction system, for example.

The cameras 4a to 4c are each an imaging device for capturing a still image or moving image and are configured to sequentially supply a captured video to the computer 2. The camera 4a, the camera 4b, and the camera 4c are disposed at a position opposed to the user across the desk 100, the upper left side of the user, and the upper right side of the user, respectively, in such a manner that each is oriented to be capable of imaging the upper surface of the desk 100. The cameras 4a to 4c are each a camera having a rolling shutter and are disposed in such a manner that the sub-scanning direction of the rolling shutter corresponds with the vertical direction in order to minimize distortion of the controller 6 in a video. Details of this point will be described later.

Figure 2:
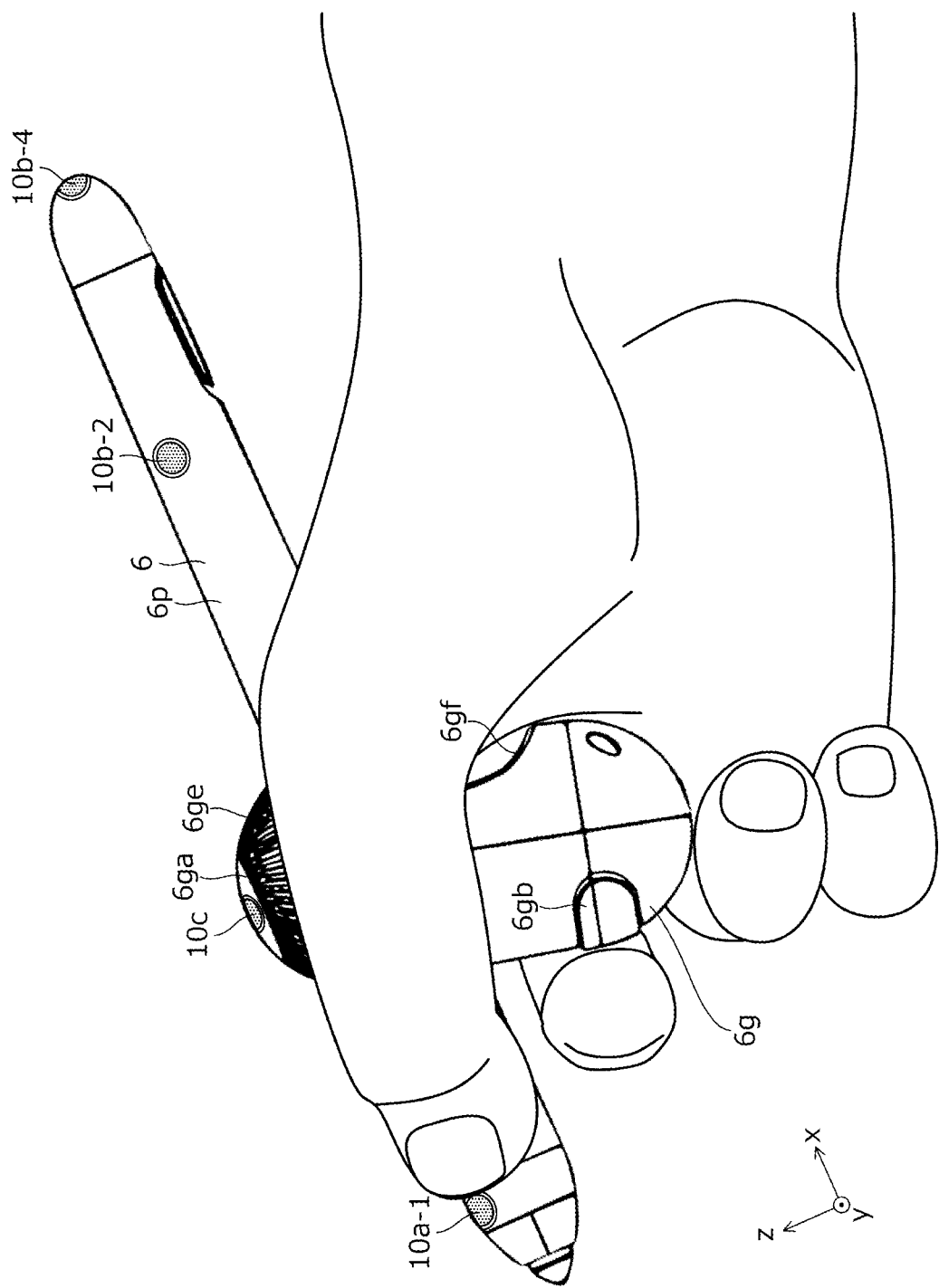
FIG. 2 is a diagram illustrating a use state of a pen-type controller according to the embodiment of the present disclosure.

FIG. 2 is a diagram illustrating the state in which a user holds the controller 6 with the right hand. FIG. 3A, FIG. 3B, FIG. 4A, and FIG. 4B are top, side and perspective views of the controller 6 as viewed from various angles. As illustrated in these figures, the controller 6 is configured to have a pen portion 6p having a pan shape and a grip portion 6g fixed to the pen portion 6p with the longitudinal direction thereof intersecting the axis direction of the pen portion 6p. Hereinafter, the axis direction of the pen portion 6p will be referred to as an x-direction. The direction that is orthogonal to the x-direction and that is in a plane defined by the x-direction and the longitudinal direction of the grip portion 6g will be referred to as a z-direction. The direction orthogonal to each of the x-direction and the z-direction will be referred to as a y-direction.

Figure 3A:
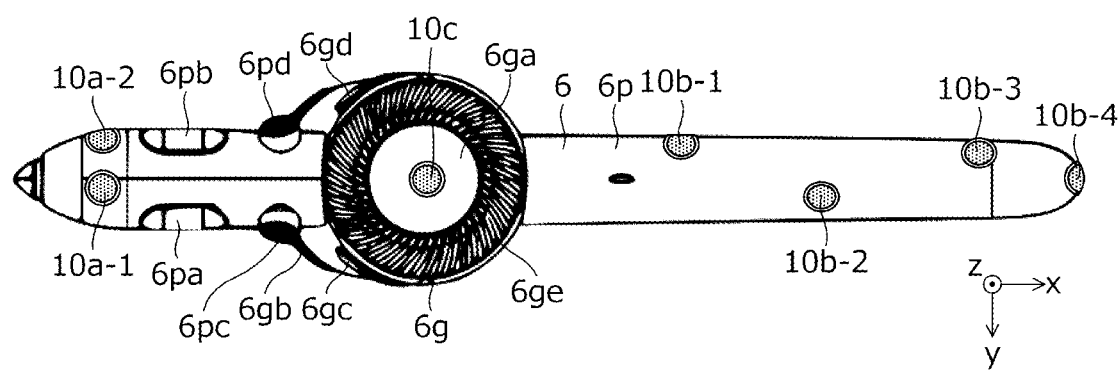
FIGS. 3A and 3B are top and side views of a controller.
Figure 3B:
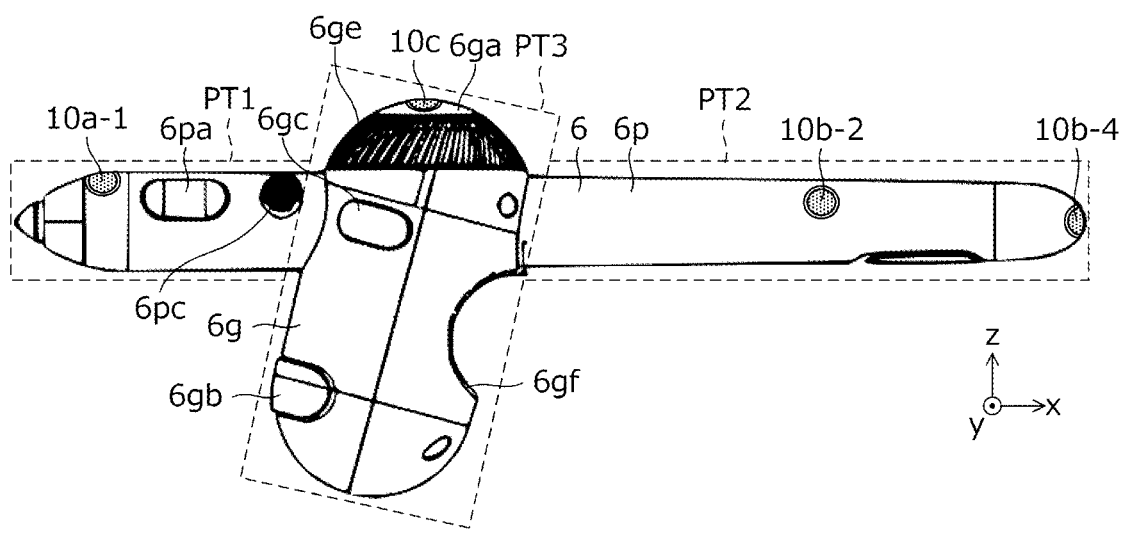
Figure 4A:
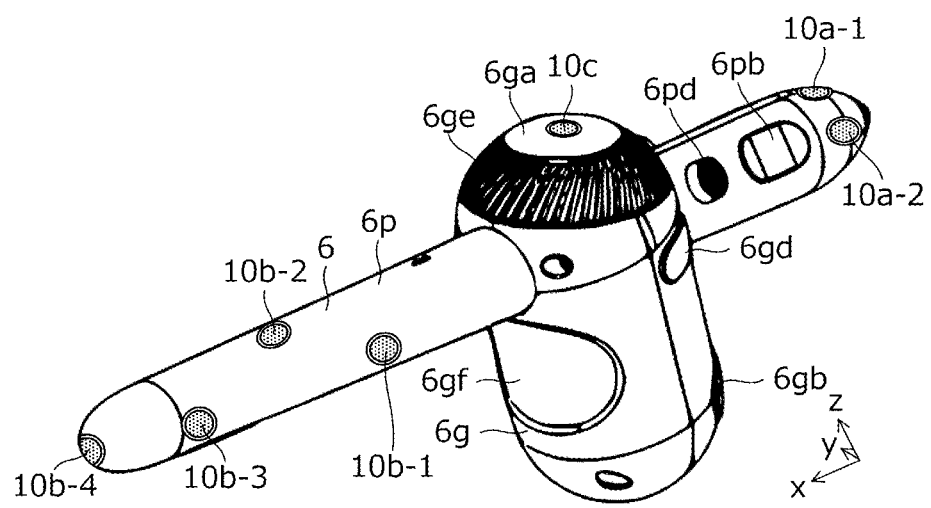
FIGS. 4A and 4B are perspective views of the controller as viewed from various angles.
Figure 4B:
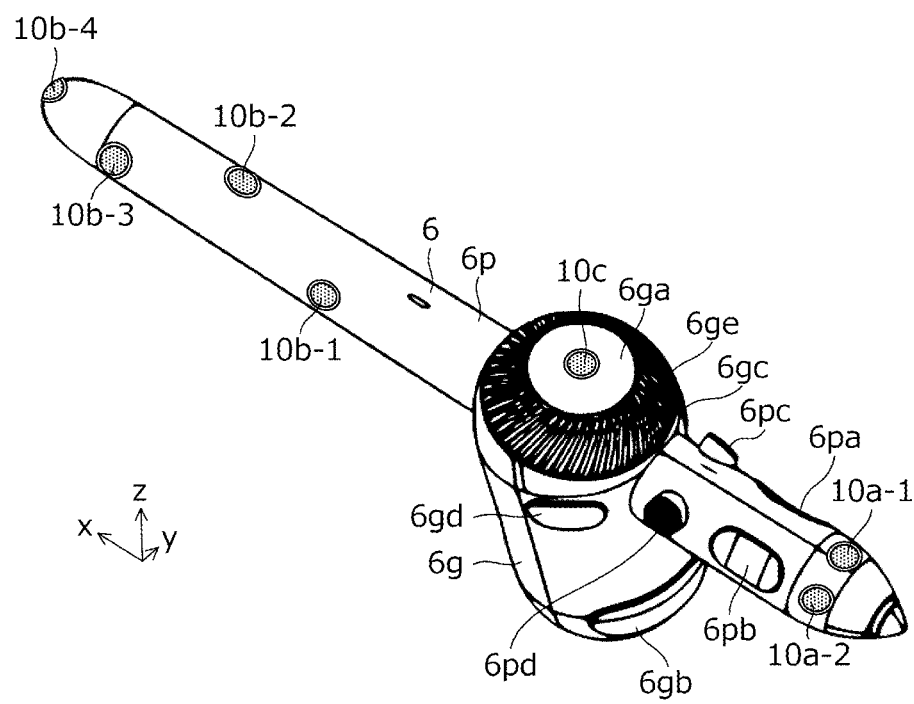

As illustrated in FIG. 3A, pressure pads 6pa and 6pb and shift buttons 6pc and 6pd are disposed on the surface of the pen portion 6p. The pressure pads 6pa and 6pb are each a component including a pressure sensor and a touch sensor and are disposed at positions near the pen tip on the side surfaces of the pen portion 6p symmetrically with respect to the xz-plane. The pressure detected by the pressure sensor is used for selection or image rendering in an application. Meanwhile, information indicating whether or not a touch is detected by the touch sensor is used for on/off-determination of pressure sensor output and for a light double tap. The shift buttons 6pc and 6pd are each a switch assigned to a menu of an application and are disposed at positions between the pressure pads 6pa and 6pb and the grip portion 6g symmetrically with respect to the xz-plane. As is understood from FIG. 2, the user who holds the controller 6 with the right hand executes operation of the pressure pad 6pa and the shift button 6pc with the thumb and executes operation of the pressure pad 6pb and the shift button 6pd with the index finger.

A tact top button 6ga, a grab button 6gb, tact buttons 6gc and 6gd, a dial button 6ge, and a recess part 6gf are disposed on the surface of the grip portion 6g as illustrated in FIGS. 3A and 3B and FIGS. 4A and 4B. The tact top button 6ga is a switch that functions as a power button when long-pressed, and is disposed on the surface of the end part of the grip portion 6g closer to the pen portion 6p out of the two end parts of the grip portion 6g in the longitudinal direction. Hereinafter, this end part (closer to the pen portion 6p) will be referred to as an "upper end part," and the end part farther away from the pen portion 6p will be referred to as a "lower end part." The dial button 6ge is a ring-shaped component configured to be rotatable and is configured to output the rotation amount. The rotation amount is used to rotate an object currently being selected, for example. The dial button 6ge is also disposed at the upper end part of the grip portion 6g in such a manner as to surround the tact top button 6ga.

The grab button 6gb is a switch used to grab and move an object and is disposed at a position near the lower end part on the side surface of the grip portion 6g on the pen tip side. Moreover, the tact buttons 6gc and 6gd are each a switch used for button assistance like a right button of a mouse, and are disposed on the side surfaces of the grip portion 6g on the pen tip side at positions near the pen portion 6p as viewed in the z-direction. The tact button 6gc is disposed on the thumb side when the controller 6 is held with the right hand, and the tact button 6gd is disposed on the index finger side when the controller 6 is held with the right hand.

As is understood from FIG. 2, the user who holds the controller 6 with the right hand executes pressing-down operation of the grab button 6gb with the middle finger. Moreover, the user executes pressing-down operation of the tact button 6gc with the thumb and executes pressing-down operation of the tact button 6gd with the index finger. Rotation operation of the dial button 6ge and pressing-down operation of the tact top button 6ga are executed with the thumb of the user. On the other hand, the tact top button 6ga and the dial button 6ge are disposed at positions non-accessible unless the user intentionally raises the thumb to the upper end part of the grip portion 6g, and therefore are exposed without being hidden by a hand of the user in the normal state.

As illustrated in FIG. 2, the recess part 6gf is configured to receive a portion of the right hand between the base of the index finger and the base of the thumb when the user holds the controller 6. The recess part 6gf is configured in the controller 6 to alleviate fatigue of the user who uses the controller 6.

Here, one or more LEDs are disposed on the surfaces of the pen portion 6p and the grip portion 6g. In the present embodiment, each LED is configured by a so-called point light source LED. The computer 2 is configured to detect the position and the orientation of the controller 6 by detecting these LEDs in the videos captured by the cameras 4a to 4c.

The arrangement of the LEDs will specifically be described. The one or more LEDs are disposed in such a manner that one or more LEDs are disposed in each of three parts PT1 to PT3 of the controller 6 illustrated in FIG. 3B. The part PT1 is the part of the pen portion 6p located on the pen tip side as viewed from the grip portion 6g. The part PT2 is the part of the pen portion 6p located on the pen rear side as viewed from the grip portion 6g. The part PT3 is the grip portion 6g. In the illustrated example, two LEDs 10a-1 and 10a-2 are disposed in the part PT1, four LEDs 10b-1 to 10b-4 are disposed in the part PT2, and one LED 10c is disposed in the part PT3.

The two LEDs 10a-1 and 10a-2 corresponding to the part PT1 are disposed at positions slightly closer to the grip portion 6g than the pen tip in such a manner as to be lined up at the same position as viewed in the x-direction. The LED 10b-4, of the four LEDs 10b-1 to 10b-4 corresponding to the part PT2, is disposed at the tail end of the pen. Meanwhile, the other three LEDs 10b-1 to 10b-3 are disposed in a zigzag manner from the grip portion 6g to the tail end of the pen. Specifically, the LED 10b-1 and the LED 10b-3 are disposed at positions close to the right side surface of the part PT2, and the LED 10b-2 is disposed at a position on the left side surface of the part PT2.

The LED 10c corresponding to the part PT3 is disposed on the surface of the upper end part of the grip portion 6g (more specifically, the surface of the tact top button 6ga). As described above, the tact top button 6ga is exposed without being hidden by a hand of the user in the state in which the user is not operating the tact top button 6ga. Therefore, arranging the LED 10c on the surface of the tact top button 6ga allows the computer 2 to always detect the controller 6 with a high probability. Thus, it becomes possible to detect the position and the orientation of the controller 6 with high accuracy. Moreover, because no LED is arranged at a lower part of the grip portion 6g, the pattern of the LEDs in the video is simplified, which makes shape recognition by the computer 2 easy.

Moreover, by disposing the LED 10c on the surface of the upper end part of the grip portion 6g, a technical advantage is achieved to accurately assess the rotation of the controller 6 around the pen axis. This point will be described in detail below with reference to FIGS. 5A to 5D and FIGS. 6A to 6D.

FIGS. 5A to 5D and FIGS. 6A to 6D are diagrams illustrating rotation of the controller 6 around the pen axis. FIGS. 5A and 5C and FIGS. 6A and 6C are each a front view of the controller 6 as viewed from the pen tip side and illustrate the state in which the controller 6 is rotated around the pen axis (x-direction) in the order of FIG. 5A, FIG. 5C, FIG. 6A, and FIG. 6C. FIGS. 5B and 5D and FIGS. 6B and 6D are side perspective views of the controller 6 as viewed from the left side and correspond to FIGS. 5A and 5C and FIGS. 6A and 6C, respectively.

Figure 5B:
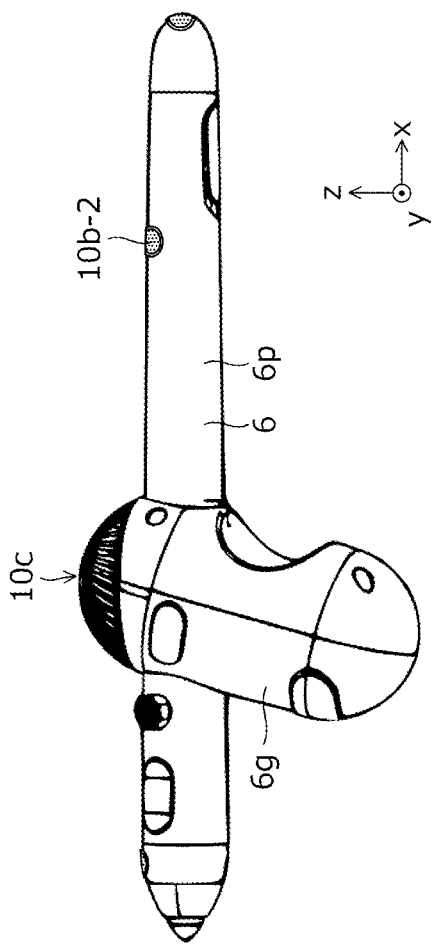
FIGS. 5A to 5D are diagrams illustrating rotation of the controller around the pen axis.
Figure 5A:
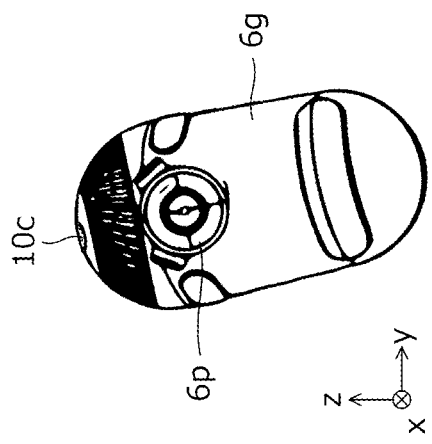
Figure 5D:
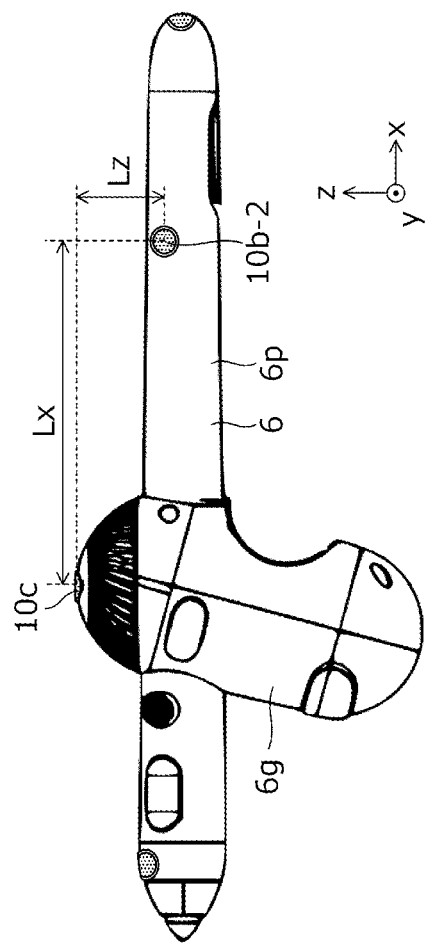
Figure 5C:
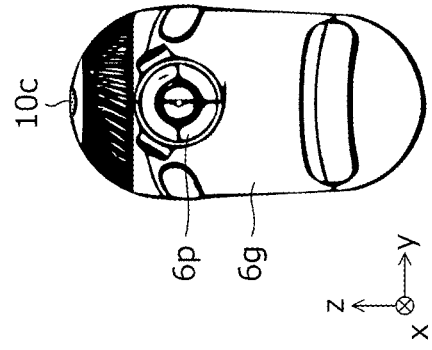
Figure 6A:
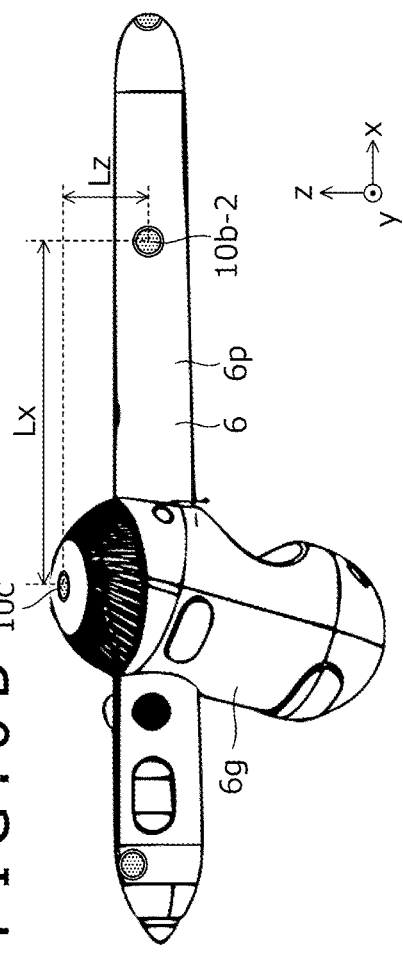
FIGS. 6A to 6D are diagrams illustrating the rotation of the controller around the pen axis.
Figure 6B:
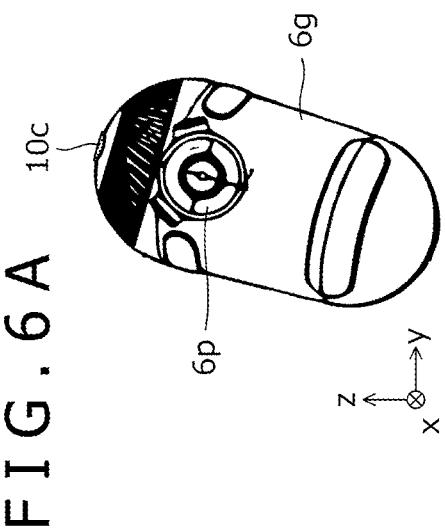
Figure 6C:
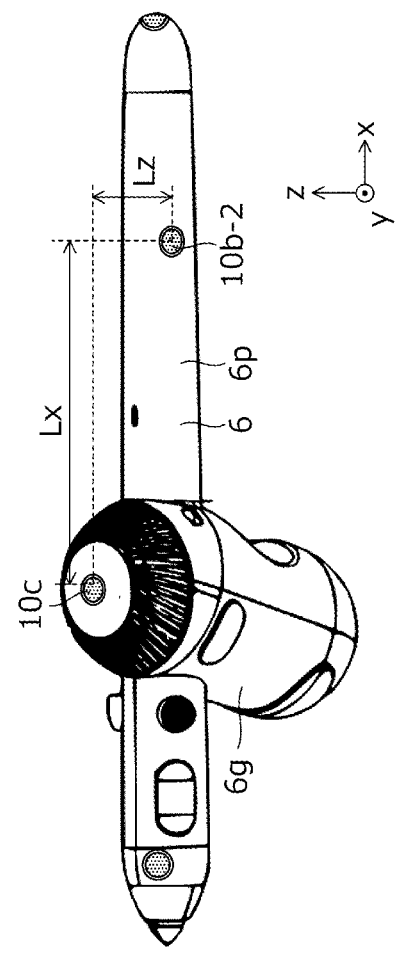
Figure 6D:
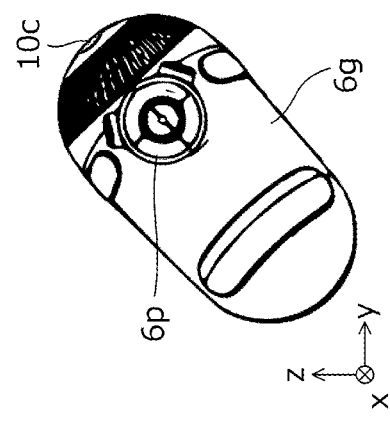

When the controller 6 is in the state of FIGS. 5A and 5B, the LED 10b-2 located in the part PT2 of the pen portion 6p appears in the video from the camera 4b located on the left side of the controller 6, whereas the LED 10c located on the surface of the tact top button 6ga does not appear in this video. Then, the LED 10c comes to appear as the controller 6 rotates around the pen axis. A distance Lz in the z-direction between the LED 10c and the LED 10b-2 that appear in the video becomes shorter as the controller 6 rotates in the order of FIGS. 5C and 5D, FIGS. 6A and 6B, and FIGS. 6C and 6D. On the other hand, a distance Lx in the x-direction between the LED 10c and the LED 10b-2 does not change. Therefore, the computer 2 can derive the rotation angle of the controller 6 around the pen axis on the basis of Lz, Lx, information on the distance from the other LEDs, information on the angle and so forth.

Referring back to FIGS. 3A and 3B, the controller 6 according to the present embodiment has the LEDs 10a-1 and 10a-2 in the part PT1 on the pen tip side. This can bring the centroid of the coordinates derived by the computer 2 closer to the pen tip side, compared with the case in which an LED is not disposed in the part PT1. Therefore, in view of this point also, it can be said that using the controller 6 according to the present embodiment makes it possible to detect the position and the orientation of the controller 6 with high accuracy.

Moreover, the LED 10a-1 and the LED 10a-2 disposed in the part PT1 are disposed asymmetrically with respect to the xz-plane including the axis direction of the pen portion 6p and the longitudinal direction of the grip portion 6g. Similarly, the LEDs 10b-1, 10b-2, and 10b-3 disposed in the part PT2 are also disposed asymmetrically with respect to the xz-plane including the axis direction of the pen portion 6p and the longitudinal direction of the grip portion 6g. That is, as described above, the three LEDs 10b-1, 10b-2, and 10b-3 are disposed in a zigzag manner from the grip portion 6g to the tail end of the pen. This allows the computer 2 to discriminate the left and the right of the controller 6.

FIG. 7 is a diagram illustrating videos of the cameras 4b and 4c that capture the controller 6 according to the present embodiment. Each bright point in the videos corresponds to the LED disposed on the surface of the controller 6. As illustrated in this diagram, using the controller 6 according to the present embodiment creates an obviously noticeable difference in the arrangement of the LEDs between the video of the camera 4b, which is imaging the controller 6 from the left side, and the video of the camera 4c, which is imaging the controller 6 from the right side. Therefore, the computer 2 can reliably discriminate the left and the right of the controller 6 in the videos of the cameras 4b and 4c.

Moreover, the LEDs are more concentrated on the right side of the controller 6, as is understood from FIG. 3A.

Because the controller 6 is frequently used while being held in the right hand, the left side of the controller 6 tends to be in the blind area as viewed from the cameras 4a to 4c. Thus, more concentrated arrangement of the LEDs on the right side can facilitate the LEDs are visible in the videos captured by the cameras 4a to 4c when the controller 6 is used while being held in the right hand.

Figure 8A:
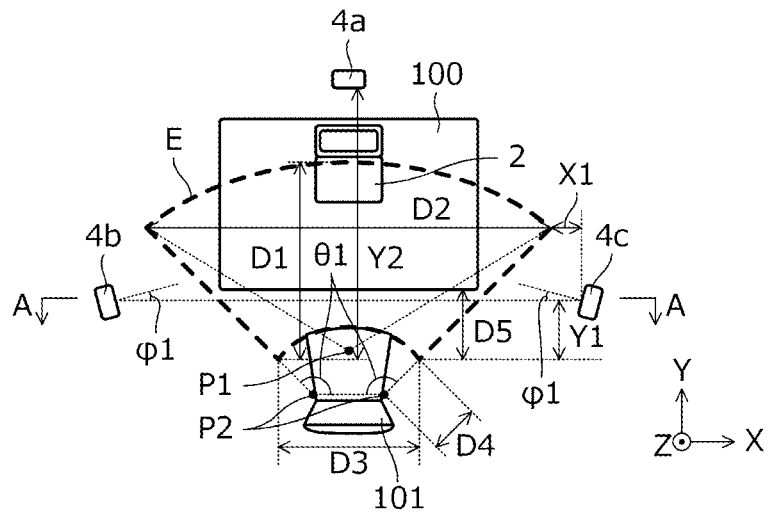
FIGS. 8A to 8C are diagrams for explaining arrangement of a plurality of cameras.
Figure 8B:
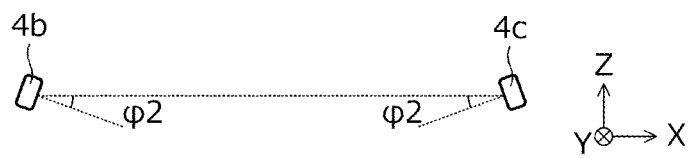
Figure 8C:
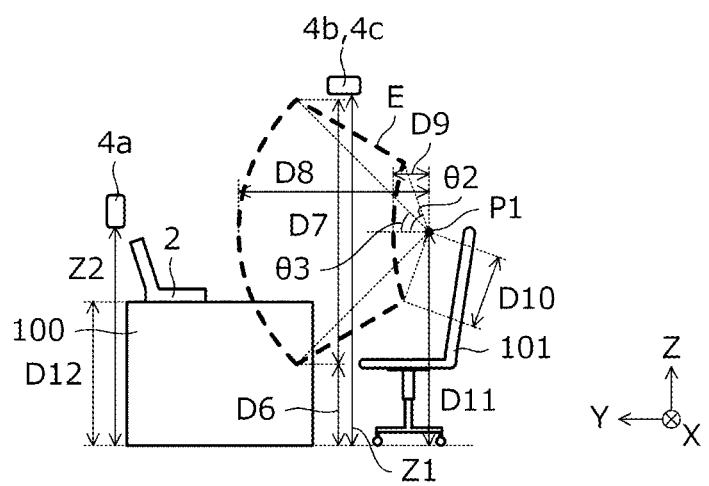

Next, preferred arrangement of the cameras 4a to 4c will be described. FIGS. 8A to 8C are diagrams for explaining the arrangement of the cameras 4a to 4c. The desk 100 and the desk chair 101 illustrated in FIGS. 8A and 8C are the same as those illustrated in FIG. 1, and the user uses the tracking system 1 in the state in which the user sits in the desk chair 101 while facing the computer 2 on the desk 100. FIG. 8B is a sectional view of the cameras 4b and 4c corresponding to line A-A in FIG. 8A. Hereinafter, the direction from the camera 4b toward the camera 4c will be referred to as the X-direction, and the direction from the user toward the camera 4a will be referred to as the Y-direction, and the vertical direction will be referred to as the Z-direction.

The illustrated position P1 is of the head-mounted display 5 illustrated in FIG. 1, and the two illustrated positions P2 are of both shoulders of the user. The cameras 4a to 4c are disposed to be capable of capturing the entire area located above the desk 100, out of a substantially fan-shaped region E that expands from these positions P1 and P2 toward the computer 2. Specifically, based on the size, shape, and position of the region E defined based on lengths D1 to D4 and an angle θ1 illustrated in FIG. 8A, lengths D6 to D11 and angles θ2 and θ3 illustrated in FIG. 8C, and so forth, and based on the distance from the rear end of the region E to the front end of the desk 100 defined based on a length D5 illustrated in FIG. 8A, further based on the height of the desk 100 defined based on a length D12 illustrated in FIG. 8C, the following is calculated to determine how to arrange the cameras 4a to 4c: a distance X1 in the X-direction from the region E to each of the cameras 4b and 4c, a distance Y1 in the Y-direction from the rear end of the region E to each of the cameras 4b and 4c, a distance Y2 in the Y-direction from the rear end of the region E to the camera 4a, a distance Z1 from the floor surface to the cameras 4b and 4c, a distance Z2 from the floor surface to the camera 4a, an angle φ1 formed by the imaging direction of each of the cameras 4c and 4b and the X-direction in the XY-plane, and an angle φ2 formed by the imaging direction of each of the cameras 4c and 4b and the X-direction in the XZ-plane. Deciding the arrangement of the cameras 4a to 4c in this manner allows the computer 2 to reliably detect the position and the tilt of each of the head-mounted display 5, the controller 6, and the position detecting device 3 on the basis of the videos captured by the cameras 4a to 4c.

Next, description will be given regarding structures of the cameras 4a to 4c arranged such that the sub-scanning direction of a rolling shutter corresponds to the vertical direction. In the following, first, the rolling shutter will be described with reference to FIGS. 9A and 9B. Thereafter, the structures of the cameras 4a to 4c according to the present embodiment will be specifically described with reference to FIG. 10 and FIG. 11.

Figure 9A:
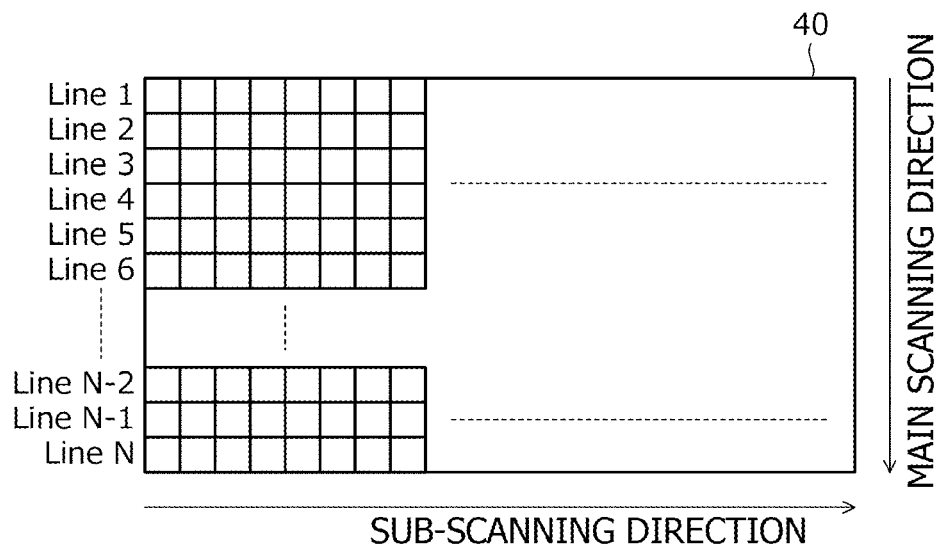
FIG. 9A is a diagram illustrating an image sensor incorporated in each of the cameras.

FIG. 9A is a diagram illustrating an image sensor 40 incorporated in each of the cameras 4a to 4c. Each one of squares illustrated in this diagram represents a pixel. As illustrated in the diagram, the image sensor 40 includes a pixel matrix obtained by arranging multiple pixels in a matrix form. Hereinafter, the number of rows of the pixel matrix is defined as N. The row direction of the pixel matrix will be referred to as a "main scanning direction," and the column direction will be referred to as a "sub-scanning direction."

Figure 9B:
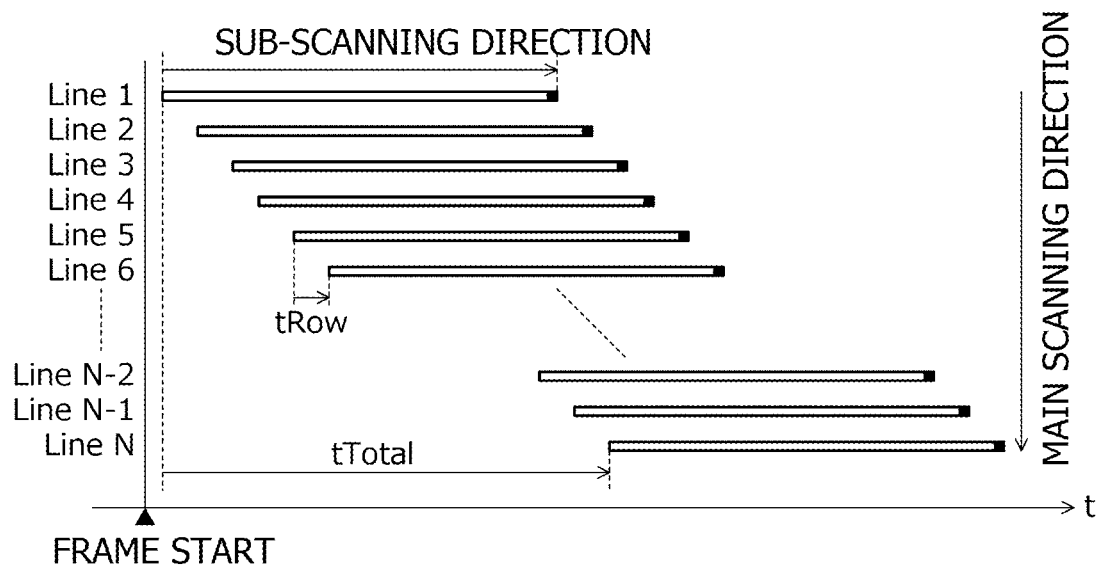
FIG. 9B is a diagram for explaining operation of a rolling shutter.

FIG. 9B is a diagram for explaining operation of the rolling shutter. The horizontal axis of this diagram represents time, and the vertical axis represents the main scanning direction of the pixel matrix. Horizontally-long rectangles illustrated in the diagram represent the time in which multiple pixels included in one row are scanned along the sub-scanning direction.

As illustrated in FIG. 9B, the cameras 4a to 4c each having the rolling shutter are configured to execute processing of scanning (exposing and reading) multiple pixels in each row along the sub-scanning direction while shifting the rows in the main scanning direction. As the result of such operation of the cameras 4a to 4c, start of the scanning of the n-th (n=2 to N) row is delayed by time tRow compared with start of the scanning of the n−1-th row. Further, start of the scanning of the N-th row is delayed by a time tTotal=tRow×(N−1) compared with start of the scanning of the first row.

Because of the delay, a time difference is generated in the imaging timing between one end and the other end of an object in the main scanning direction in the cameras 4a to 4c each having the rolling shutter. As a result, distortion occurs in the video when the object rapidly moves in the sub-scanning direction. In view of this, in the present embodiment, the cameras 4a to 4c are configured such that the cameras 4a to 4c may be positioned to align the sub-scanning direction of the rolling shutter with the vertical direction. This can minimize distortion of the controller 6 in the video because generally, while the user frequently moves the controller 6 in the horizontal direction, the user rarely moves the controller 6 in the vertical direction.

Figure 10:
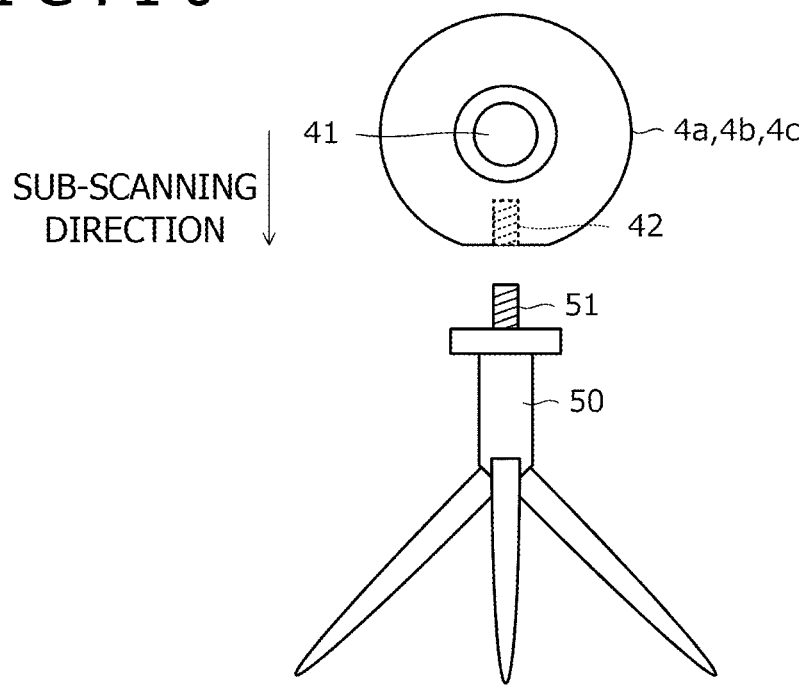
FIG. 10 is a diagram illustrating a structure of each of the cameras arranged such that a sub-scanning direction of the rolling shutter corresponds to the vertical direction.

FIG. 10 is a diagram illustrating the structures of the cameras 4a to 4c which can be positioned such that the sub-scanning direction of the rolling shutter corresponds with the vertical direction. As illustrated in this diagram, the cameras 4a to 4c each have a shutter 41 and a screw hole 42, which receives a camera attachment screw 51 extending upwardly from a tripod 50 to thereby secure the camera to the tripod 50. The screw hole 42 is made in the cameras 4a to 4c in such a manner that the axis direction thereof is parallel to the sub-scanning direction of the shutter 41. This makes it possible to arrange the cameras 4a to 4c in such a manner that the sub-scanning direction of the rolling shutter corresponds with the vertical direction when each of the camera 4a to 4c is attached to the tripod 50. Therefore, it becomes possible to minimize distortion of the controller 6 in the video.

As described above, in the pen-type controller 6 according to the present embodiment, the LED 10c is disposed at the upper end part of the grip portion 6g, that is, a part rarely hidden by a hand of the user. Therefore, it becomes possible to detect the position and the orientation of the pen-type controller 6 by the computer 2 with high accuracy.

Moreover, according to the tracking system 1 according to the present embodiment, distortion of the controller 6 in the video can be minimized when the cameras 4a to 4c each having the rolling shutter as the shutter 41 are used. Therefore, it becomes possible to detect the position and the orientation of the controller 6 with high accuracy.

Although the preferred embodiments of the present disclosure have been described above, it is obvious that the present disclosure is not limited by the described embodiments and further embodiments and modifications are within the scope of the present disclosure.

For example, in the above-described embodiment, the example in which seven LEDs (two LEDs 10a-1 and 10a-2, four LEDs 10b-1 to 10b-4, and one LED 10c) are disposed on the controller 6 has been described. However, it is obvious that the number, seven, is merely one example and different numbers of LEDs may be used. However, when a large number of LEDs are disposed on the surface of the controller 6, LEDs may overlap with each other in the videos captured by the cameras 4a to 4c, and discriminating different LEDs from each other may become difficult. Thus, arranging too many LEDs may be undesirable. The number of LEDs employed in the present embodiment, seven, is a number optimized in view of such consideration.

Moreover, although the example in which three cameras 4a to 4c are used has been described in the above-described embodiment, four or more cameras may be used.

Figure 11:
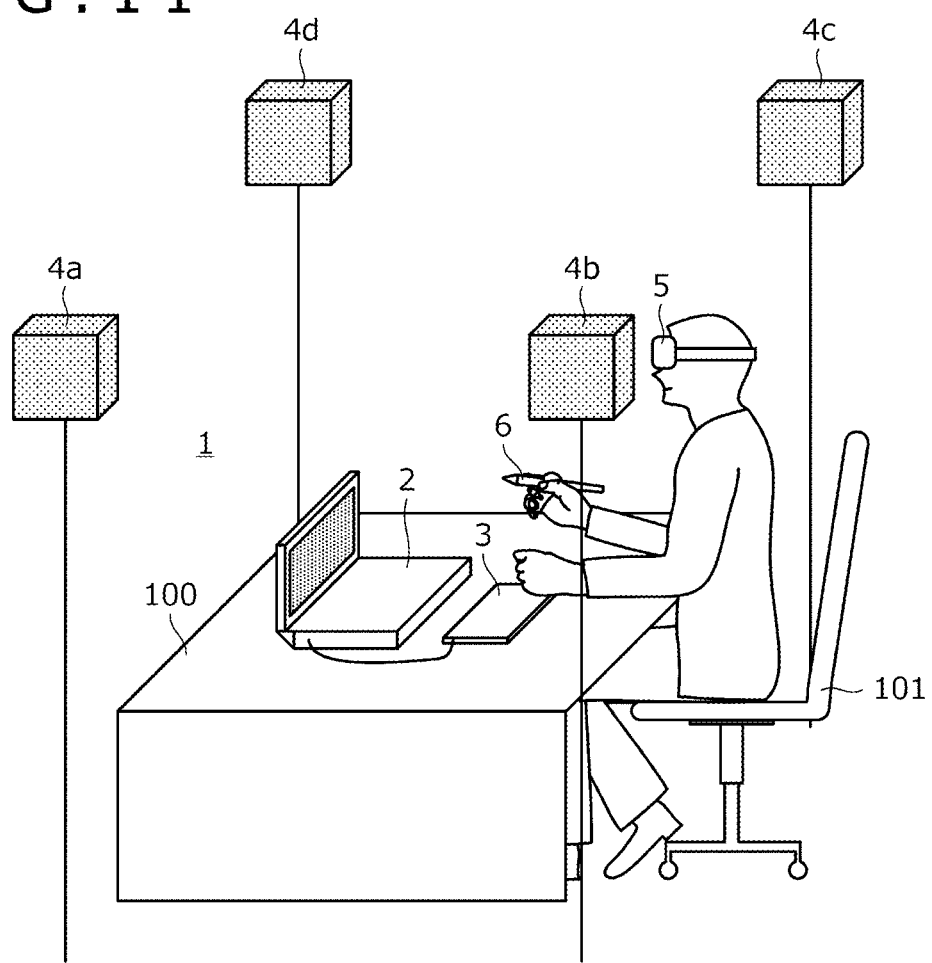
FIG. 11 is a diagram illustrating a use state of the tracking system according to a modification example of the embodiment of the present disclosure.

FIG. 11 is a diagram illustrating a use state of the tracking system 1 according to a modification example of the present embodiment. The tracking system 1 according to the present modification example is similar to the tracking system 1 described above, except that the modification example includes four cameras 4a to 4d. The cameras 4a to 4d are disposed to be capable of imaging a region above the desk 100 from the upper side of four corners of the desk 100. This allows the computer 2 to reliably detect the position and the tilt of each of the head-mounted display 5, the controller 6, and the position detecting device 3 on the basis of the videos taken by the cameras 4a to 4d. The specific position of each of the cameras 4a to 4d can be determined in such a manner that the entire area located above the desk 100 in the region E illustrated in FIGS. 8A and 8C can be captured, similarly as described above.

In the above-described embodiment, each LED disposed on the surface of the controller 6 is configured by a so-called point light source LED. However, at least some of the LEDs can be an LED having a larger light emission area than a so-called point light source LED.

Figure 12A:
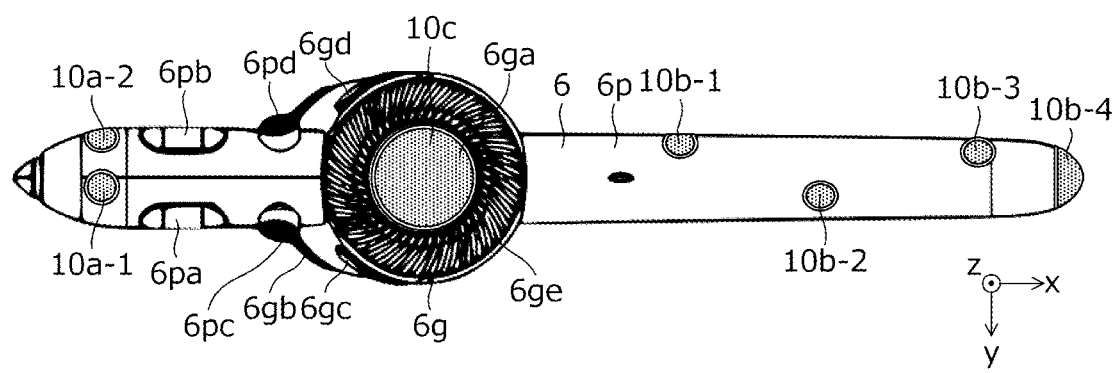
FIGS. 12A and 12B are diagrams illustrating the controller according to a modification example of the embodiment of the present disclosure.
Figure 12B:
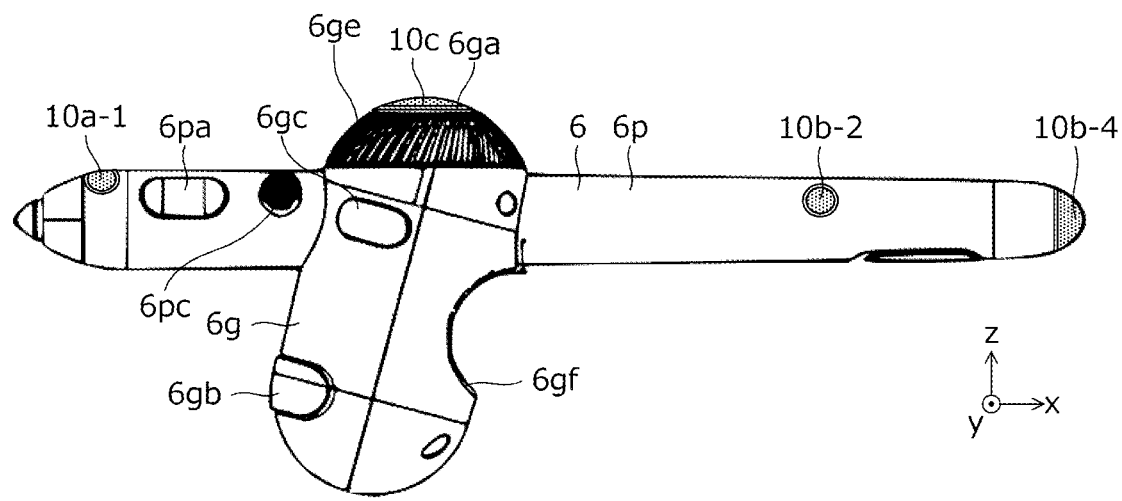

FIGS. 12A and 12B are diagrams illustrating the controller 6 according to a modification example of the present embodiment. In the present modification example, the LED 10c disposed on the surface of the upper end part of the grip portion 6g and the LED 10b-4 disposed at the tail end of the pen are configured by LEDs having a larger light emission area than a so-called point light source LED. Moreover, in the present modification example, the LED 10c and the LED 10b-4 are configured in a hemispherical shape to follow along the shape of their installation part. This allows the computer 2 to obtain the center and the radius of the hemisphere from a circle that appears in the videos taken by the cameras 4a to 4c, to thereby acquire coordinate positions based only on the videos capturing the LED 10c and the LED 10b-4. Therefore, it becomes possible to detect the position and the orientation of the controller 6 with higher accuracy.

The invention claimed is:

1. A controller comprising:
a pen portion having a pen shape having a first axial end and a second axial end opposite from the first axial end;
a grip portion that intersects an axis direction of the pen portion;
wherein the pen portion includes a first pen portion extending from the grip portion toward the first axial end and a second pen portion extending from the grip portion toward the second axial end; and
two or more first light emitting parts disposed on the first pen portion.

2. The controller according to claim 1, further comprising:
a first operation part disposed at an end part of the grip portion that is closer to the axis of the pen portion than another end part of the grip portion,
wherein an end light emitting part is disposed at the first operation part.

3. The controller according to claim 2, further comprising:
a second operation part disposed to surround the first operation part.

4. The controller according to claim 1, further comprising:
one or more second light emitting parts disposed on the second pen portion.

5. The controller according to claim 1, further comprising:
an end light emitting part disposed at an end part of the grip portion that is closer to the axis of the pen portion than another end part of the grip portion.

6. The controller according to claim 4, wherein
the one or more second light emitting parts are disposed asymmetrically with respect to a plane including the axial direction of the pen portion and a longitudinal direction of the grip portion.

7. The controller according to claim 1, wherein
the two or more first light emitting parts are disposed asymmetrically with respect to a plane including the axial direction of the pen portion and a longitudinal direction of the grip portion.

8. The controller according to claim 1, wherein
the pen portion has a first side surface and a second side surface, and
the two or more first light emitting parts are disposed on the first side surface and the second side surface, and the number of first light emitting parts disposed on the first side surface equals the number of first light emitting parts disposed on the second side surface.

9. The controller according to claim 1, wherein
the pen portion has a first side surface and a second side surface, and
the two or more first light emitting parts are disposed on the first side surface and the second side surface, and the number of first light emitting parts disposed on the first side surface is different from the number of first light emitting parts disposed on the second side surface.

10. A tracking system for tracking motion of a controller including a pen portion having a pen shape having a first axial end and a second axial end opposite from the first axial end, a grip portion that intersects an axis direction of the pen portion, wherein the pen portion includes a first pen portion extending from the grip portion toward the first axial end and a second pen portion extending from the grip portion toward the second axial end, and a two or more first light emitting parts disposed on the first pen portion, the tracking system comprising:
one or more cameras each having a rolling shutter and being disposed such that a sub-scanning direction of the rolling shutter corresponds with a vertical direction; and
a computer that executes tracking of motion of the controller on a basis of a video taken by the one or more cameras.

11. The tracking system according to claim 10, wherein
the one or more cameras are used in a state in which the one or more cameras are fixed to a tripod on which a camera attachment screw is disposed upward, and
the one or more cameras have a screw hole for fixing the camera to the tripod, wherein an axis direction of the screw hole is parallel to the sub-scanning direction of the rolling shutter.

* * * * *